July 29, 1941.  H. G. KELLOGG  2,251,240
WINDSHIELD WIPER MOTOR
Original Filed Aug. 29, 1938   2 Sheets-Sheet 1
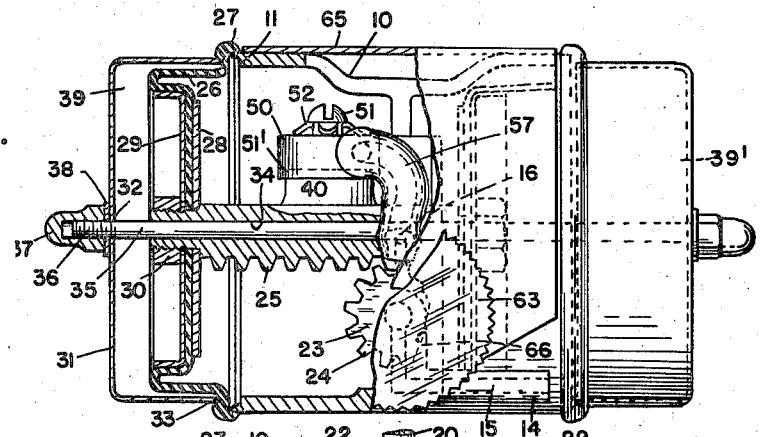
INVENTOR
HOMER G. KELLOGG
BY
Whittemore Hulbert & Belknap
ATTORNEYS July 29, 1941. H. G. KELLOGG 2,251,240
WINDSHIELD WIPER MOTOR
Original Filed Aug. 29, 1938 2 Sheets-Sheet 2
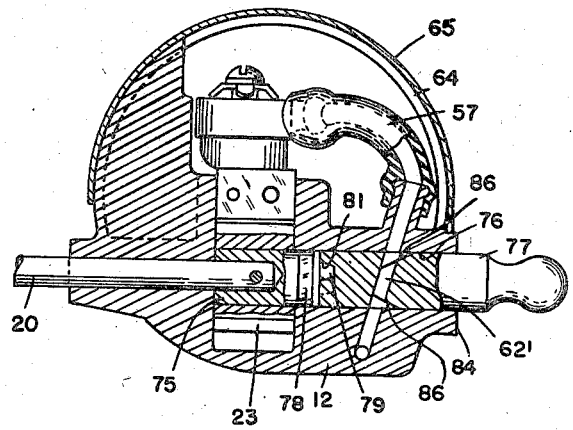
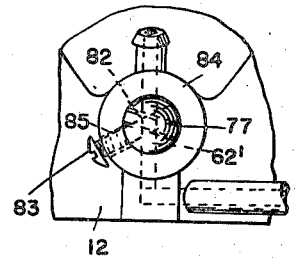
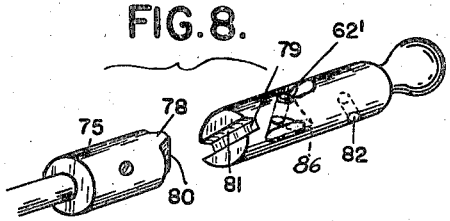
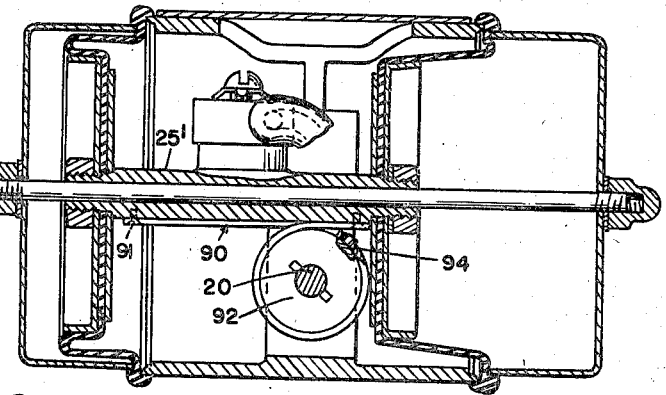
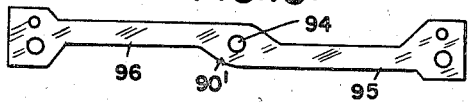
INVENTOR
HOMER G. KELLOGG
BY
ATTORNEYS Patented July 29, 1941

2,251,240

UNITED STATES PATENT OFFICE 2,251,240

WINDSHIELD WIPER MOTOR

Homer G. Kellogg, Detroit, Mich., assignor to Motor Products Corporation, Detroit, Mich., a corporation of New York Original application August 29, 1938, Serial No. 227,412. Divided and this application March 25, 1940, Serial No. 325,901

21 Claims. (Cl. 121—123)

The present invention relates to a windshield cleaner and more particularly to a novel type of pressure actuated windshield cleaner, and is a division of my co-pending application Serial No. 227,412, entitled "Windshield wiper," filed August 29, 1938.

Windshield wiper motors of the pressure operated reciprocable type have required rather complex mechanism for actuating the reversing valve.

The present construction is notable for its extreme simplicity and economy of manufacture as well as the structural arrangement which renders it very easily assembled and disassembled. The simplicity of the structure is accomplished without omission of any important function by a substantially complete departure from all structures known to the prior art.

It is an object of the present invention to provide a windshield wiper assembly having a novel reversing valve.

It is a further object of the invention to provide a windshield wiper assembly characterized by the association of two opposed motor elements interconnected by a power transmitting element in combination with motor control means carried in part by said element.

It is a further object of the invention to provide a valve in combination with a flexible conduit adapted to serve as biasing means for the valve and also as a conduit providing for passage of fluid pressure to the valve.

It is a further object of the invention to provide a windshield wiper assembly in which a reversing valve is associated with a reciprocable power transmitting means such that reverse movement of the valve is prevented during reciprocation of the element.

Other objects of the invention will be apparent as the description proceeds and when taken in conjunction with the accompanying drawings, wherein:

Figure 1 is a front elevation of my improved construction with parts broken away;

Figure 2 is a plan view of my improved construction with parts broken away;

Figure 3 is a substantially transverse section of my improved windshield wiper assembly;

Figure 4 is a perspective showing the relationship between the valve and the wiper arm shaft;

Figure 5 is an exploded perspective showing the valve structure;

Figure 6 is a section like that of Figure 3 showing a slightly different embodiment of my invention;

Figure 7 is a fragmentary side elevation of the embodiment shown in Figure 6;

Figure 8 is an exploded perspective showing a detail of the embodiment of Figure 6;

Figure 9 is a longitudinal section illustrating yet another embodiment of my invention;

Figure 10 is a detail of the tape shown in Figure 9; and

Figure 11 is an elevation of the drum used in the embodiment shown in Figure 9.

The assembly shown in Figures 1 to 4 comprises essentially a frame member 10 which is open at the top and front thereof, as best seen in Figure 3, and which is provided with annular end portions 11 defining opposed end openings. The frame 10 is preferably in the form of a casting and is provided with a central block 12 in which is formed a channel 13 for a purpose which will presently appear. The block has a fluid passage 15 formed therein communicating with a nipple 14. A second nipple 16 is formed on the block 12 and the nipple 16 is bored to provide a passage 17 communicating with the passage 15 previously referred to.

The block 12 is also provided with a tapered recess 18 which interrupts the passage 17. The recess 18 is for the reception of a valve member which will subsequently be described.

The block 12 in the frame 10 is further provided with an aperture 19 in which the wiper arm drive shaft 20 is journaled.

Adjacent the upper portion of the channel 13 is provided a flat web 21 which extends for a short distance along the channel 13 and is for a purpose which will later be described.

The block 12 is provided with a pair of bosses 22 which are tapped for the reception of bolts. This construction provides means for mounting the assembly on the motor vehicle and, as will be readily understood, may be supplanted by any other conventional mounting means when rendered desirable by the environment of the assembly.

The wiper arm drive shaft 20 has keyed thereto, as indicated at 22', a pinion 23 which preferably has teeth 24 extending only partially about the periphery thereof. The pinion 23 is adapted to be driven by a meshing rack 25 which is reciprocated by the motor means now to be described.

As previously referred to, the frame 10 terminates at each end in the annular portion 11 which defines oppositely directed openings in the frame. A flexible diaphragm 26 has a peripheral bead 27 formed thereon adapted to fit over the annular portion 11 of the frame. The diaphragm 26 in its central portion is received between the plate 28 and a shallow cup 29, the plate 28 and the cup 29 being held in clamping relation at the end of the rack member 25 as by a nut 30, or the like.

The construction of my improved windshield wiper assembly is identical at both ends, and I will therefore describe in detail the construction of one end only. It will be understood that the construction at the opposite end is identical.

A cup 31 which is centrally apertured as at 32 has an edge 33 which is adapted to clamp the peripheral edge of the diaphragm 26 to the annular portion 11 of the frame, the bead 27 cooperating with the parts just described as best seen in Figure 1.

The rack member 25, previously described, is rigidly secured to the diaphragm 26 through the medium of the plate 28 and the cup 29 and is provided with a central aperture 34. Through this aperture 34 a rod 35 is adapted to be slidingly received. The rod 35 also passes through the aperture 32 in the cup member 31 and is provided at its outer ends with threads, indicated at 36, for cooperation with a clamping nut 37. A suitable sealing gasket 38 is provided.

From the foregoing description it will be seen that the cup 31 and the flexible diaphragm 26 form an expansible and contractable chamber 39. I have found that the most efficient results are obtained by employing a flexible diaphragm, such as shown at 26, but it will be understood that if desired a piston member reciprocable within the cup 31 and secured to the rack member 25 may be substituted.

The rack member 25 is provided near its mid portion with an upstanding boss 40, as best seen in Figure 5, which serves as a valve seat. The rack member 25 is further provided with a passage 41, (see Figure 2), which communicates with the interior of the chamber 39. A corresponding passage 42 is adapted to communicate with the chamber 39' corresponding to chamber 39 at the opposite end of my assembly. Passages 41 and 42 communicate with the passages 43 and 44 which open adjacent each other in the top surface of the boss 40. Passage 43 opens into a lunar shaped recess 45 and the passage 44 opens into a corresponding lunar shaped recess 46.

A valve 50 is rotatably supported on the valve seat formed by the boss 40 by means of a bolt 51 and a depending flange 51' adapted to surround a portion of the boss 40 and is urged against the valve seat resiliently as by the spring 52. The valve 50 is further provided with a nipple 53 which has a passage 54 formed therein which communicates with recess 55. A short length of resilient tubing 57, preferably of pure gum rubber, interconnects nipples 53 and 16. The valve 50 is further provided with a recess 56 communicating with an aperture 56' which opens in the upper face of the valve member.

The valve 50 is adapted to be shifted between two limiting positions, one of which is that indicated in Figure 2 in which the recess 55 communicates through the recess 46 with the passages 44 and 42 so that the right-hand chamber 52 is connected to the source of fluid pressure. At the same time the aperture 56 in the valve 50 communicates through the recess 45 with passages 43 and 41 and therefore the left-hand chamber 39 is opened to atmosphere.

The present motor is primarily intended to be connected to a source of reduced pressure in a motor vehicle, such as for example the manifold. However, the motor described operates equally well at a pressure above atmospheric and, therefore, I have referred generically to sources of pressure, intending to be comprehended within this term, both a source of reduced pressure and a source of super-atmospheric pressure.

The valve 50, as best seen in Figure 2, is provided with a projection or cam surface 60 formed thereon. The projection 21 of the frame previously referred to is adapted to cooperate with the projection 60 to assist in controlling movements of the valve 50.

It will be understood the valve 50 being carried by the reciprocable power transmitting member 25 moves therewith relative to the upwardly projecting flat plate 21. In the position shown in Figure 2, the resilient tube 57, due to its own resiliency, has rotated the valve 50 to the position shown.

In this position the source of reduced fluid pressure, which as previously described may be the manifold of the vehicle, is connected through the flexible tube 57, the recess 55, the recess 46 and passages 44 and 42 to the chamber 39 at the right-hand end of the mechanism. At the same time the chamber 39 at the left of Figure 2 communicates through passages 41 and 43, recess 45, recess 56 and the passage 56' to atmosphere. Under these circumstances atmospheric pressure acting on the diaphragm 26 at the left of Figure 2 exerts a greater force thereon than does the reduced pressure in chamber 39' at the right in Figure 2. Under these conditions, the power transmitting element 25 moves to the right carrying the valve 50 therewith. During the initial movement, the valve is maintained at substantially the position shown in Figure 2. However, as this movement of the power transmitting member continues so that the nipple 53 is carried to the right of nipple 16 the resilient tube 57 tends to turn the valve in a clockwise direction.

The projection 60 formed on the valve 50 engages the surface of the projection 21 almost immediately upon initiation of its movement to the right in Figure 2. Throughout its movement the projection 60 bears against the projection 21 and is thereby prevented from rotating in a clockwise direction. The projection 21 is proportioned so that just prior to completion of the movement of the power transmitting member 25 and associated parts to the right in Figure 2, the projection 60 of the valve slips off the right-hand edge of the member 21. At this time a substantial force has been built up, due to distortion of the resilient tube 57, with the result that as soon as the projection 60 is released from the plate 21 the valve 50 snaps clockwise to a predetermined position.

As formed, the valve passages both in the valve seat formed at the top of boss 40 and in the valve member 50, terminate at their engaging surface in lunar shaped recesses, as previously described. Due to this, it is unnecessary that the valve be moved to a predetermined position, since when the valve is moved to approximate position the lunar shaped recesses will overlap substantially and provide a substantially unrestricted passage. It is therefore unnecessary to provide exactly predetermined stop means for the valve with the result that the motor will operate more quietly. In motors of this type, where a valve member is snapped between predetermined positions and is brought to rest by engaging stop means, there is unavoidably caused a certain amount of undesirable noise.

As best seen in Figure 3, a manual valve 61, which is tapered to fit snugly within the conical recess 18 is provided. Valve member 61 has a passage 62 formed therein, the passage 62 being adapted when the valve is rotated to proper position to connect the portions of passage 17 above and below the conical recess 18. A button 63 is provided, the edges of which are knurled to facilitate manual manipulation.

One of the important features of the construction of my improved windshield wiper assembly is that the frame has an opening 64 at its side above the valve 61. This opening 64 provides for access to the interior of the casing for inspection and adjustment. In order to close the opening 64 when the device is to be used, a resilient cover plate 65 is provided. This cover plate is preferably made of thin sheet metal and is formed as best seen in Figure 3 so as to embrace slightly more than 180° of the generally cylindrical frame. Due to this construction, the cover plate may be placed in position simply by pressing the same downwardly upon the frame, as seen in Figure 3. When in position, it will be retained tightly thereon, due to its own inherent resiliency.

I take advantage of the resiliency of my cover plate to perform another important function in my assembly. As best seen in Figure 3, the cover plate at its forward edge is provided with a slot 66 which is adapted to pass over the stem 67 of the valve 61. At the same time, the slot 66 is of less width than the large end of the valve plug 61. With the parts assembled as shown in Figure 3, as will be readily apparent, the cover plate around the slot 66 bears against the valve plug 61 and tends to retain the same tightly in its seat 18. In order to remove the valve 61, it is only necessary to lift the cover plate 65 upwardly after which the valve may be withdrawn directly.

The manual valve 61 performs another important function, as will now be described. The wiper arm drive shaft 20 at its inner end has a lateral projection 70 formed thereon for which a recess 71 is provided, communicating with the tapered valve seat 18. The valve plug 61 has formed thereon an eccentric key or projection 72 which is adapted to cooperate with the lateral projection 70. With the parts as shown in Figure 3, it will be noted that the projection 72 is in lowermost position, whereas projection 70 is in uppermost position.

As is conventional in windshield wipers, the wiper arm drive shaft 20 is adapted to oscillate through an angle less than 180°. In other words, in normal operation the projection 70 will oscillate in either direction from the upright position shown in Figure 3 to positions somewhat less than 90° to either side thereof. These two limiting positions will be the positions of the projection 70, which corresponds to the extreme positions of the wiper arm carried by the shaft 20, as will readily be understood.

With the wiper arm in normal operation, if the button 63 is turned so that the passage 62 no longer interconnects the separated portions of the passage 17, the motors will stop. The position in which the motors stop is not predetermined and will correspond to their instantaneous position when the manual valve is operated.

It is highly desirable that the windshield wiper blade upon interruption of its operation be moved to and retained in an inoperative position, preferably in a limiting position so that the wiper blade will not interfere with the vision of the operator of the vehicle. In my improved construction this is provided for in a very simple manner by the projections 70 and 72, previously referred to.

The first rotation of the manual valve 61 interrupts operation of the motors and a further turning of the button 63 brings the projection 72 into engagement with the projection 70 irrespective of the position at which the wiper arm is stopped. Continued rotation of the button 63 through the inter-engagement of the projections 70 and 72 results in a manual rotation of the drive shaft 20 until it reaches limiting position. It will be appreciated that this may be accomplished by rotating the button 63 in either direction so that the wiper arm may be parked in either limiting position as desired.

In the event that the wiper blade is moved, as often happens when the attendant at a gasoline station wipes the windshield, this results merely in the turning of the button 63 and it is then only necessary for the operator of the vehicle to return the wiper blade to parked position by rotation of the button 63.

A second embodiment of my invention is illustrated in Figures 6 to 8, inclusive, in which a somewhat different arrangement is provided for moving the wiper arm to parked position. This embodiment involves somewhat different principles and in several respects is superior to that previously described.

With the exception of the manual valve and the drive shaft for the wiper arm, the parts are the same as previously described and the description will not be repeated. As best seen in Figure 6, the wiper arm drive shaft 20 carries a pinion 23. The pinion 23 is secured to the shaft 20 through the medium of a member 75 which is keyed or otherwise secured to the shaft 20 and is interlocked by suitable means to the pinion 23. It will be appreciated that if desired the pinion 23 and member 75 may be combined as a single integral member.

The block 12 of the frame in this modification is provided with a cylindrical bore 76 for the reception of a cylindrical push-pull type valve 77. The valve 77 is provided with a passage 62' which serves to interconnect the portions of the passage 17 separated by the bore 76. In the position shown in Figure 6, the valve is in open position and pressure is being supplied through the flexible tube 57 to the valve 50.

The member 75 is provided with a projection 78, best seen in Figure 8. A recess 79 which corresponds in shape with the projection 78 is formed in the end of the valve 77. Projection 78 has tapered sides 80, and the sides 81 of the slot 79 are correspondingly tapered for a purpose which will presently appear.

In addition to the passage 62', the valve 77 is provided with a tapped hole 82 for the reception of a bolt 83, as seen in Figure 8. The bore 76 is surrounded adjacent its end with a bushing indicated in Figure 7 by the numeral 84. This bushing is provided with a longitudinal slot 85 for the reception of the bolt 83. As will be readily understood, the slot 85 cooperates with the bolt 83, prevents rotation of the valve 77 and also limits its movements. If desired, the slot 85 may be open at one end of the bushing so that removal of the bolt is not necessary in order to remove the valve.

The valve 77 is adapted to be reciprocated to control the supply of fluid pressure to the motors and also to locate the wiper arm in parked position. This is acomplished as follows: With the parts in the position indicated in Figure 6, the valve 77 may be pushed inwardly substantially interrupting communication between passages 62' and 17. In order that this interruption will not be complete, the valve is provided with short tapered portions 86 communicating with the passage 62'. Since with the parts in the position as shown in Figure 6, the projection 78 is not in alignment with the slot 79, the parts will engage before the passage 17 is closed. The partial closure of this passage, however, will reduce the rate of operation of the motors with the result that the windshield wiper will approach parked position relatively slowly. As soon as the projection 78 becomes aligned with the recess 79 a valve may be pushed further inwardly simultaneously completely interrupting the flow of fluid through passage 17 and blocking the wiper arm drive shaft 20 in parked position.

Due to the inclined sides 80 of the projection 78 and the correspondingly inclined sides 81 of the slot 79, forcible displacement of the wiper arm drive shaft, as for example in cleaning the windshield, will cause the valve 77 to be moved slightly outwardly without damage to the parts. It will be understood that the resilient cover 65 in this modification does not engage the valve 77, the slot 66 therein being substantially larger than the diameter of the valve 77.

By means of this construction a windshield wiper in which the blade may be mechanically parked in predetermined position is provided in an extremely simple manner. The number of parts is reduced to a minimum and the parts as designed may be produced economically.

A modification of the means for transmitting power from the motors to the drive shaft is illustrated in Figures 9 to 11. In these figures a mechanism is illustrated in which a tape and drum drive is substituted for the rack and pinion drive previously described. Figure 9 shows the essential parts of the mechanism. Since this figure differs only in the power transmitting means it will not be described in detail. The power transmitting member 25' which corresponds to the rack 25, shown in Figure 1, is not provided with rack teeth, but instead has secured adjacent its end a tape 90, shown in detail in Figure 10. The tape 90 is bolted as indicated at 91 to the power transmitting member 25' and at its central portion is wrapped about a drum 92 shown in detail in Figure 11. The drum 92 is keyed or otherwise secured to the shaft 20 and is adapted to be rotated by the tape 90. For this purpose a lug or projection 93 is formed on the drum which is adapted to be received within an aperture 94 formed centrally in the tape 90. In order to prevent interference between the two ends of the tape, they are laterally offset, as indicated in Figure 10, to provide portions 95 and 96, which when wrapped about the drum 92 will be laterally or axially spaced from each other. In this modification the parts not described in detail are identical to those previously described. It will be understood that either the push-pull type valve or the rotary type valve may be employed.

In the present case reference is made to an expansible and contractable chamber and it will be understood that this describes a conventional cylinder and piston, or other equivalent device, as well as a diaphragm closed chamber.

The foregoing detailed description has been given for clearness and understanding only, and no unnecessary limitation should be understood therefrom.

Certain features not claimed but shown herein are being claimed in my copending application, Ser. No. 325,902.

What I claim as my invention is:

1. In a fluid motor, an expansible and contractable chamber including a movable driving element, a power transmitting member connected to said driving element, a valve carried by said member, a source of pressure, and means responsive to movement of said power transmitting member to alternately connect said chamber to said source of pressure and to exhaust said chamber to atmosphere, said means comprising a resilient member engaging said valve and adapted to shift the valve alternately to limiting position, and means preventing shifting of said valve except at the end of each reciprocation.

2. In a fluid motor, a reciprocable power transmitting member, a valve controlling reciprocation of said member, resilient means for shifting said valve to limiting positions, and means carried in part by said power transmitting member and in part by a stationary part of said motor for preventing shifting of said valve except at the end of each reciprocation.

3. In a fluid motor, a reciprocable power transmitting member, a valve controlling reciprocation of said member, resilient means for shifting said valve to limiting positions, and means carried in part by said power transmitting member and in part by a stationary part of said motor for preventing shifting of said valve except at the end of each reciprocation, said last named means comprising a projection on said valve and a surface adapted to engage said projection in either shifted position during the mid portion of each reciprocation.

4. In a fluid motor, a reciprocable power transmitting member, a valve carried thereby, an over-center resilient means for shifting said valve to limiting positions, and means carried in part by said power transmitting member and in part by a stationary part of said motor for preventing shifting of said valve except at the end of each reciprocation.

5. In a fluid motor, a reciprocal power transmitting member, a valve carried thereby, an over-center resilient means for shifting said valve to limiting positions, and means carried in part by said power transmitting member and in part by a stationary part of said motor for preventing shifting of said valve except at the end of each reciprocation, said last named means comprising a projection on said valve and a stationary surface adapted to engage said projection in either shifted position during the mid portion of each reciprocation.

6. In a fluid motor: an expansible and contractable chamber including a movable driving element; a reciprocable power transmitting member connected to said driving element, said member having a passage communicating with the interior of said chamber; a valve shiftable between limiting positions for alternately connecting said passage to a source of pressure and opening the same to exhaust said chamber to atmosphere; a resilient conduit connected to said valve, said conduit having one end fixed and the opposite end movable with said power transmitting member, said conduit forming a part of the connection between the source of pressure and said chamber and adapted alternately to shift said valve to opposite limiting positions.

7. In a fluid motor: an expansible and contractable chamber including a movable driving element; a reciprocable power transmitting member connected to said driving element, said member having a passage communicating with the interior of said chamber; a valve shiftable between limiting positions for alternately connecting said passage to a source of pressure and opening the same to exhaust said chamber to atmosphere; a resilient conduit connected to said valve, said conduit having one end fixed and the opposite end movable with said power transmitting member, said conduit forming a part of the connection between the source of pressure and said chamber and adapted alternately to shift said valve to opposite limiting positions; and means in part fixed relative to said power transmitting member and in part movable therewith for permitting shifting of said valve only at the end of each reciprocation.

8. In a fluid motor: an expansible and contractable chamber including a movable driving element; a reciprocable power transmitting member connected to said driving element, said member having a passage communicating with the interior of said chamber; a valve shiftable between limiting positions for alternately connecting said passage to a source of pressure and opening the same to exhaust said chamber to atmosphere; a resilient conduit connected to said valve, said conduit having one end fixed and the opposite end movable with said power transmitting member, said conduit forming a part of the connection between the source of pressure and said chamber and adapted alternately to shift said valve to opposite limiting positions; and means in part fixed relative to said power transmitting member and in part movable therewith for permitting shifting of said valve only at the end of each reciprocation, said last named means comprising a projection on said valve and a surface adapted to engage said projection in either shifted position during the mid portion of each reciprocation.

9. In a fluid motor: an expansible and contractable chamber including a movable driving element; a reciprocable power transmitting member connected to said driving element, said member having a passage communicating with the interior of said chamber; a valve carried by said member and shiftable between limiting positions for alternately connecting said passage to a source of pressure and opening the same to exhaust said chamber to atmosphere; a resilient conduit having one end fixed and the other end connected to said valve, said conduit adapted to connect the source of pressure with said valve and to shift said valve to limiting position.

10. In a fluid motor: an expansible and contractable chamber including a movable driving element; a reciprocable power transmitting member connected to said driving element, said member having a passage communicating with the interior of said chamber; a valve carried by said member and shiftable between limiting positions for alternately connecting said passage to a source of pressure and opening the same to exhaust said chamber to atmosphere; a resilient conduit having one end fixed and the other end connected to said valve, said conduit adapted to connect the source of pressure with said valve and to shift said valve to limiting position; and means in part fixed relative to said power transmitting member and in part movable therewith for permitting shifting of said valve only at the end of each reciprocation.

11. In a fluid motor: an expansible and contractable chamber including a movable driving element; a reciprocable power transmitting member connected to said driving element, said member having a passage communicating with the interior of said chamber; a valve carried by said member and shiftable between limiting positions for alternately connecting said passage to a source of pressure and opening the same to exhaust said chamber to atmosphere; a resilient conduit having one end fixed and the other end connected to said valve, said conduit adapted to connect the source of pressure with said valve and to shift said valve to limiting position; and means in part fixed relative to said power transmitting member and in part movable therewith for permitting shifting of said valve only at the end of each reciprocation, said last named means comprising a projection on said valve and a surface adapted to engage said projection in either shifted position during the mid portion of each reciprocation.

12. In a fluid motor: an expansible and contractable chamber including a movable driving element; a reciprocable power transmitting member connected to said driving element, said member having a passage communicating with the interior of said chamber; a valve shiftable between limiting positions for alternately connecting said passage to a source of pressure and opening the same to exhaust said chamber to atmosphere; a resilient conduit connected to said valve, said conduit having one end fixed and the opposite end movable with said power transmitting member, said conduit forming a part of the connection between the source of pressure and said chamber, and adapted alternately to shift said valve to opposite limiting positions, said conduit comprising a short section of rubber tubing.

13. In a fluid motor: an expansible and contractable chamber including a movable driving element; a reciprocable power transmitting member connected to said driving element, said member having a passage communicating with the interior of said chamber; a valve carried by said member and shiftable between limiting positions for alternately connecting said passage to a source of pressure and opening the same to exhaust said chamber to atmosphere; a resilient conduit having one end fixed and the other end connected to said valve, said conduit adapted to connect the source of pressure with said valve and to shift said valve to limiting position, said conduit comprising a short section of rubber tubing.

14. In a fluid motor, a pair of expansible and contractable chambers including opposed movable driving elements; a power transmitting member interconnecting said elements, said member having passages, said passages having openings adjacent each other and communicating with said chambers, a valve carried by said member and adapted alternately to connect one opening to a source of pressure and the other to atmosphere, and means responsive to reciprocation of said power transmitting member to shift said valve between limiting positions, said last named means comprising a resilient conduit having one end fixed and the other end connected to said valve, said conduit connecting said valve to the source of pressure.

15. In a fluid motor, a pair of expansible and contractable chambers including opposed movable driving elements; a power transmitting member interconnecting said elements, said member having passages, said passages having openings adjacent each other and communicating with said chambers, a valve carried by said member and adapted alternately to connect one opening to a source of pressure and the other to atmosphere, and means responsive to reciprocation of said power transmitting member to shift said valve between limiting positions, said last named means comprising a resilient conduit having one end fixed and the other end connected to said valve, said conduit connecting said valve to the source of pressure; and means in part fixed relative to said power transmitting member and in part movable therewith for permitting shifting of said valve only at the end of each reciprocation.

16. In a fluid motor, a pair of expansible and contractable chambers including opposed movable driving elements; a power transmitting member interconnecting said elements, said member having passages, said passages having openings adjacent each other and communicating with said chambers, a valve carried by said member and adapted alternately to connect one opening to a source of pressure and the other to atmosphere, and means responsive to reciprocation of said power transmitting member to shift said valve between limiting positions, said last named means comprising a resilient conduit having one end fixed and the other end connected to said valve, said conduit connecting said valve to the source of pressure; and means in part fixed relative to said power transmitting member and in part movable therewith for permitting shifting of said valve only at the end of each reciprocation, said last named means comprising a projection on said valve and a surface adapted to engage said projection in either shifted position during the mid portion of each reciprocation.

17. In a fluid motor, a reciprocating element, a valve movable between two positions, a resilient member engaging said valve, one end of said member being fixed and the other end of said member being movable with said element, means preventing movement of said valve during the middle portion of the stroke of said element, whereby at the end of each stroke of said element, said member snaps said valve to a predetermined position and retains said valve in such position without additional stop means.

18. In a fluid motor having an expansible and contractable chamber, a valve seat, a conduit communicating with the interior of said chamber and terminating in a port on said valve seat, a reversing valve mounted on said valve seat for movement between two positions to control the application of fluid pressure to said chamber, a flexible, resilient conduit connected to a source of differential pressure, said conduit having portions which are relatively movable in accordance with expansion and contraction of said chamber and being connected to said reversing valve so as to resiliently bias the same toward one or the other of its two positions.

19. In a fluid motor having an expansible and contractable chamber, a power transmitting element movable back and forth by expansion and contraction of said chamber, a valve seat on said element, a conduit communicating with the interior of said chamber and terminating in a port on said valve seat, a reversing valve mounted on said valve seat for movement between two positions to control the application of fluid pressure to said chamber, a flexible, resilient conduit connected to a source of differential pressure, said conduit having a portion fixed to a stationary part of said motor, and being connected at one end to said valve so as to bias the same toward one or the other of its two positions.

20. In a fluid motor, a reversing valve shiftable between two positions, a flexible, resilient conduit connecting said valve to a source of fluid pressure, said conduit having portions which are relatively movable upon operation of said motor, one of said portions being connected to said valve to bias the same toward one or the other of its two positions.

21. In a fluid motor, an expansible and contractable chamber, power transmitting means connected thereto and including an element movable alternately between two limiting positions, in accordance with the expansion and contraction of said chamber, a reversing valve member shiftable between two positions to control expansion or contraction of said chamber, biasing means connected to said valve and operable before completion of expansion or contraction of said chamber to reverse the direction in which it biases said shiftable valve member, a valve locking member, one of said members being movable with said element, said locking member having a surface slidably engaging said valve during the mid-portion of the relative movement between said members, to prevent shifting of said valve by said biasing means.

HOMER G. KELLOGG.